United States Patent [19]

Stotler et al.

[11] Patent Number: 5,262,598
[45] Date of Patent: Nov. 16, 1993

[54] WEIGH HOPPER SUPPORTED BY A 3-POINT SUSPENSION WITH A TENSION LOAD CELL

[75] Inventors: William D. Stotler; Mark J. Seksinsky, both of Watsontown, Pa.

[73] Assignee: Andritz Sprout-Bauer, Inc., Muncy, Pa.

[21] Appl. No.: 846,034

[22] Filed: Mar. 5, 1992

[51] Int. Cl.⁵ .................. G01G 3/08; G01G 21/24
[52] U.S. Cl. ................................ 177/229; 177/255
[58] Field of Search ............................ 177/229, 255

[56] References Cited

U.S. PATENT DOCUMENTS 3,494,435  2/1970  Rouban ........................ 177/229
4,662,464  5/1987  Nomura et al. ............... 177/229
5,035,294  7/1991  Volk, Jr. ..................... 177/255 X Primary Examiner—George H. Miller, Jr.
Attorney, Agent, or Firm—Chilton, Alix & Van Kirk

[57] ABSTRACT

A weigh hopper installation (10) includes a rigid support frame (14) and a hopper (16) having a center of gravity (42) situated laterally adjacent to the frame. Substantially all the weight of the hopper is supported through a load cell (54) carried by a rod (50) between the frame and the hopper, preferably in tension. Restraint members (62, 64, 74) are connected laterally between the frame and the hopper, for preventing horizontal movement of the hopper while permitting vertical movement of the hopper.

10 Claims, 3 Drawing Sheets

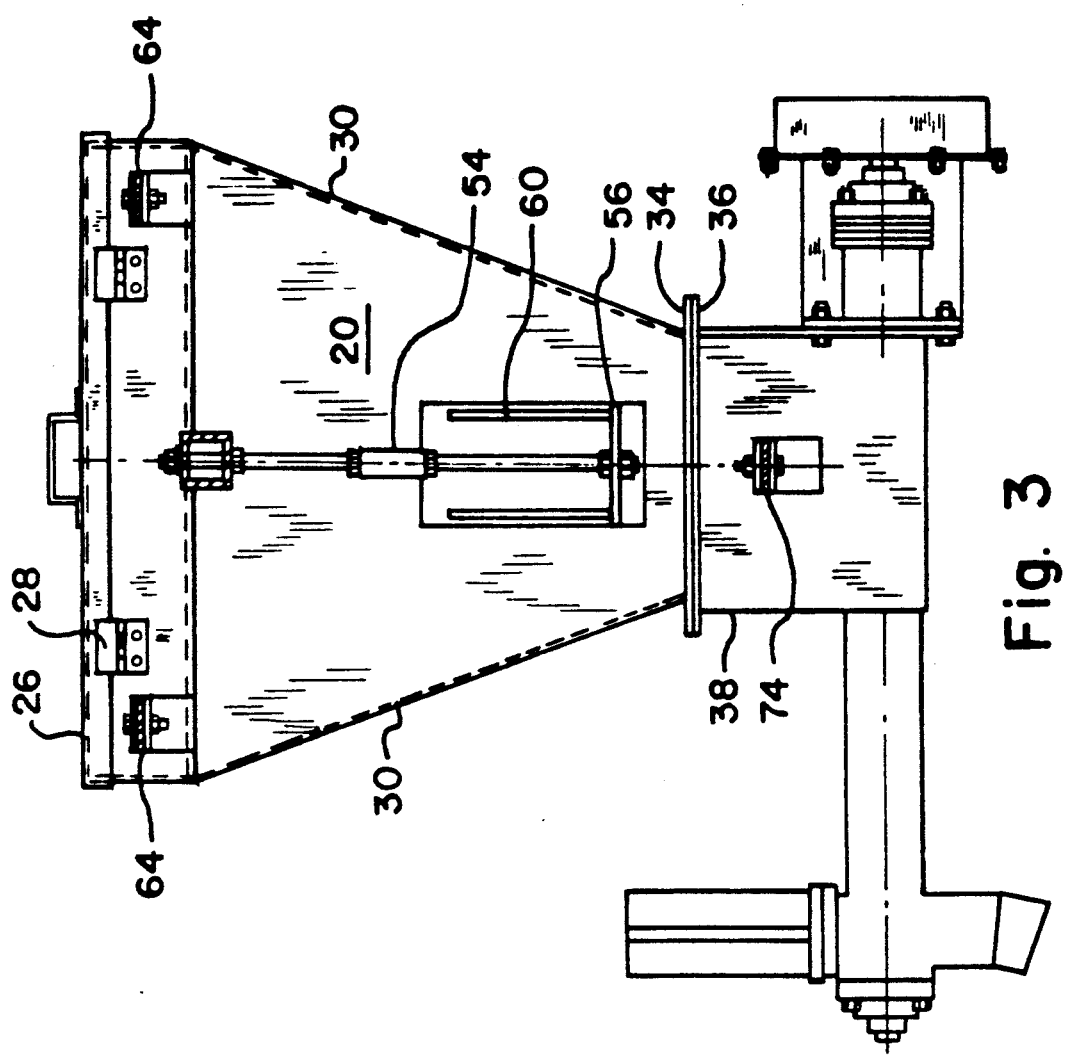

WEIGH HOPPER SUPPORTED BY A 3-POINT SUSPENSION WITH A TENSION LOAD CELL

BACKGROUND OF THE INVENTION

The present invention relates to weigh hoppers, such as those used for metering a flowable solid such as feed or the like.

Conventionally, where a dry product is metered through a hopper or vessel by weight subtraction, a load cell system is utilised with the hopper. This configuration provides a positive means for metering the product, which can be set to alarm in the event of material bridging or clogging in the feeder. Although conventional weigh hoppers perform their intended function satisfactorily, the support system for the hopper is typically relatively complex in order to properly cooperate with multiple load cells. This often encumbers free access to the top of the hopper. In addition, the need for lateral support often encumbers at least two or three sides of the hopper.

SUMMARY OF THE INVENTION

It is, accordingly, an object of the present invention to provide a simple yet effective weigh hopper system using a single, low-cost load cell.

It is another object that the load cell and hopper support structure encumber only one side of the hopper.

A weigh hopper installation according to the invention, includes a rigidly supported saddle frame, a hopper situated laterally adjacent to the frame, and means, such as a rod member, for supporting substantially all the weight of the hopper through a load cell interposed between the frame and the hopper. To maintain static equilibrium of the hopper, three horizontal lateral restraints, preferably constructed of semi-flexible composite plastic, extend between the frame and the hopper. The semi-flexible restraints hold the hopper in steady position, yet do not remove the vertical load from the rod and load cell.

Preferably, the rod member extends vertically, and is subjected to vertical loading whether the hopper is empty or contains dry product. Only minimal twisting moments develop about the axis perpendicular to the planes along which the lateral restraints extend from the frame to attachments at the hopper. The lateral restraints are able to carry small moments about this axis, which eliminates the need to install restraints on more than one side of the hopper.

This simple weigh system is virtually maintenance free, unaffected by dirt and contamination, and low in cost, because there are no bearings or machined surfaces.

BRIEF DESCRIPTION OF THE DRAWINGS

These and other objects and advantages of the invention will be described below with reference to the accompanying drawings, in which:

FIG. 3 is a view of the front of the hopper, taken along line 3—3 of FIG. 2.

DESCRIPTION OF THE PREFERRED EMBODIMENT

Figure 1:
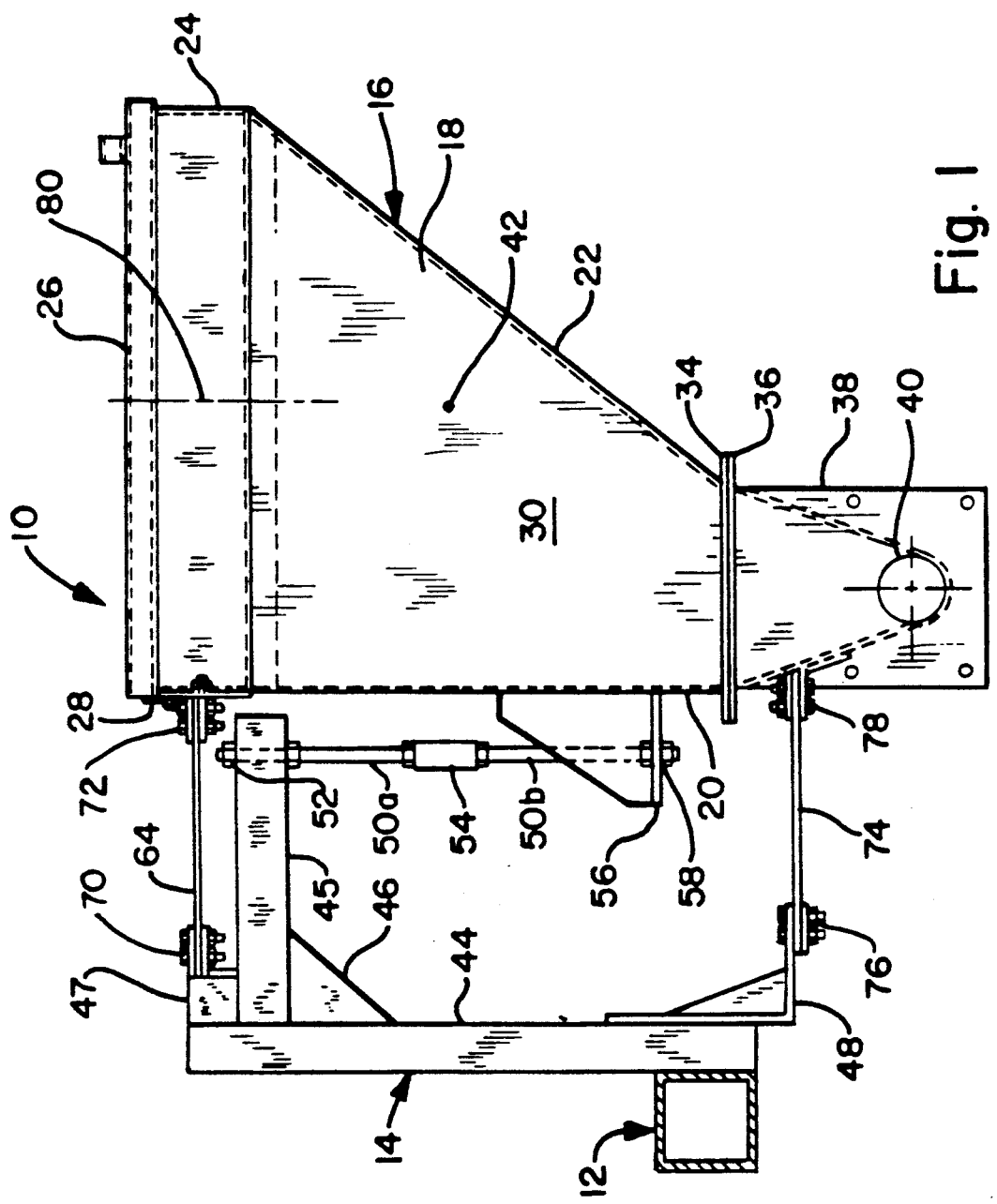
FIG. 1 is a side elevation view of a weigh hopper installation in accordance with the present invention.
Figure 2:
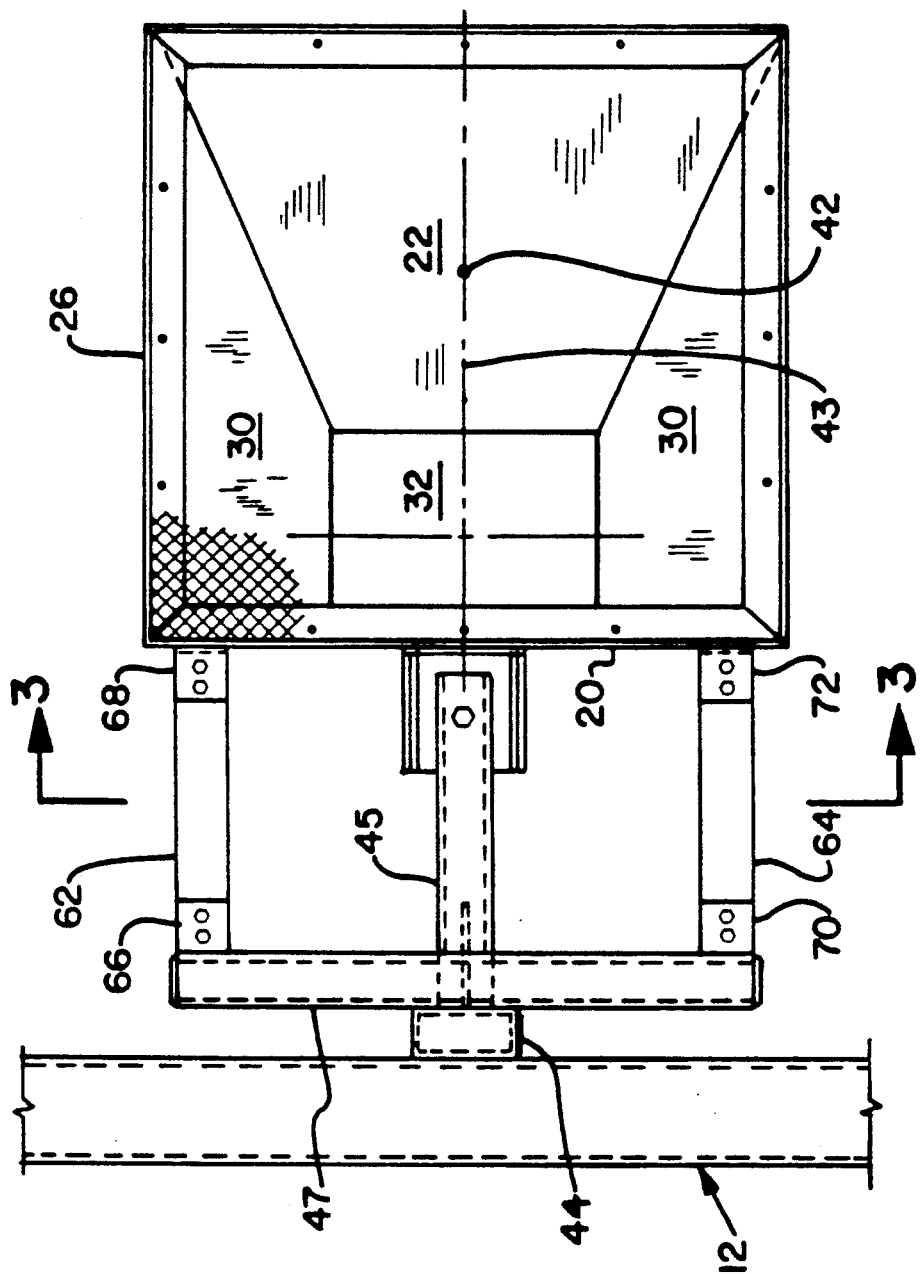
FIG. 2 is a top view of the installation shown in FIG. 1.

FIGS. 1-3 show a weigh hopper installation 10 in a mill or plant, consisting of the basic components of a girder 12 or the like, which would typically be a part of the building structure, a support frame 14 welded or otherwise rigidly attached to the girder 12, and a hopper assembly 16, supported by the frame 14 and, indirectly, by the girder 12.

The hopper assembly 16 can have a variety of shapes that do not induce large twisting moments on the supports. The hopper 16 preferably includes a body portion 18 into which dry product is deposited, and a feeder portion 38 which is integral with, or rigidly secured to, bottom of the body portion 18 via interengaged flanges 34, 36.

The body portion 18 includes a substantially vertical front wall 20, opposed, parallel side walls 30 extending perpendicularly from the front wall 20, and an oblique back wall 22. The upper portion of the body 18 can include a substantially rectangular box 24 defining an inlet opening, which may be covered by a screen member 26 hinged to the front of the box 24 or wall at 28.

The lower end or bottom of the body portion 18 defines another opening 32 leading to the feed portion 38, which contains a feeder screw or feed valve 40, as is well known in the art. For purposes of the present invention, hopper portions 18 and 38 can be considered a unitary, rigid body having a center of gravity 42. The hopper 16 is preferably symetric about a line of symmetry 43 extending between the front wall 20 and back wall 22.

The support frame 14 is interposed between the girder 12 and the hopper 16. Preferably, the support frame, or saddle, includes a column 44 extending vertically from the horizontal girder 12, for a distance that is preferably less than the full vertical dimension of the hopper 16. A support beam 45 extends horizontally from column 44 at a first elevation, perpendicularly to the front wall 20 of the hopper, and preferably along an extension of the line of symmetry 43 of the hopper, when viewed from above as shown in FIG. 2. The support beam 45 is rigidly connected to colum 44 in any manner, such as by first brace 46.

A cross brace member 47 is rigidly attached to either the column 44 or load beam 45, and extends horizontally in parallel with the front wall 20 of the hopper, on either side of the load beam 45. Preferably the length of the cross brace member 47 is substantially equal to the width dimension of the hopper front wall 20 as seen in FIG. 2, and situated above load beam 45. A bracket 48 or other attachment means, for purposes to be described below, is provided at the lower end of column 44. In general, the cross brace member 47 is located at an elevation approximately the same as that of the upper end of the hopper 16, and the bracket 48 is situated at an elevation below the center of gravity 42 of the hopper, near the lower extent thereof.

Near the free, or cantilevered end of the support beam 45, a rigid rod having an upper portion 50a and a lower portion 50b extends vertically adjacent the front wall 20 of the hopper. The upper portion 50a of the rod is secured, as at 52, to the support beam 45, and the lower portion 50b is rigidly secured to the hopper 16 through an attachment at 58 to a bracket 56 which is, in turn, welded or otherwise formed as a integral part of the hopper.

A load cell 54 is interposed between the upper and lower portions 50a, 50b, of the rod, for generating an output signal comensurate with the tension load. This tension arises from the arrangement whereby substantially the entire weight of the hopper 16 and its contents, is borne by the rod 50 and associated cell 54. In the illustrated embodiment, this load is a tension load, and the cell is a tension load cell. A suitable low cost cell is available commercially as the S type model TC-5-500 from Eagle Micro Systems, Chester Springs, Pa.

As can be more clearly seen in FIG. 2, the line of symetry 43 of the hopper, if extended horizontally, passes through either the load cell or the upper or lower rod portions 50a, 50b. Moreover, it may also be appreciated that, as viewed in FIG. 1, the attachment of tension rod 50 to the support beam 45, is above the hopper center of gravity 42, and the attachment of tension rod 50 to the hopper 16 via 56, is below the hopper center of gravity. The distance between attachment points 52 and 58 should extend sufficiently in the vertical direction, to span the variable location of the hopper center of gravity 42 resulting from empty to fully load conditions. Similarly, as shown in FIG. 2, the center of gravity 42 remains generally on the axis of symetry 43, although it may move slightly along that line as viewed in FIG. 2 between the empty and full condition of the hopper. Since the hopper assembly center of gravity is close to the geometric center relative to the vertical support point 52, the loading, unloading, and other forces acting on the hopper during operation, produce only minimal twisting moments about a vertical axis 80 which passes through the center of gravity 42.

In a significant feature of the present invention, lateral constraint of the hopper 16 can be accomplished from only one side, preferably the front wall 20, thereby minimizing encumberances on three sides of the hopper. Moreover, with the present invention, both the load support and the lateral support interact with the front wall of the hopper, within the vertical dimensions defined by the top and bottom of the hopper, thereby unencumbering the space above the hopper.

This is accomplished by providing first and second, semi-flexible restraining members 62, 64, connected at 66, 70 to the brace member 47, and at 68, 72 to the front wall 20 of the hopper respectively, so as to extend in parallel on either side of the support beam 45. Preferably, the restraint members 62, 64 are connected to the hopper, at the widest dimension as viewed in FIG. 2. Similarly, a third, semi-flexible restraining member 74 extends between bracket 48 at connection 76, to the front of hopper 16, for example at a connection 78 to the front wall 20 or to the feeder portion 38 of the hopper.

In general, the first and second, or upper, restraining members 62, 64 are at elevations above the center of gravity 42 of the hopper, preferably above the support point 52 of the tension rod 50. The lower restraining member 74, is preferably situated below the center of gravity 42, and under the attachment point 58 of the support rod 50 to the hopper.

The restraint members 62, 64 and 74 have sufficient flexibility to hold the hopper in position against rotation or horizontal displacement, without removing the vertical load from the tension load cell 54. This is an important consideration for accurate, precise metering of the dry product. Preferably, the restraining members are formed from strips or ribbons of flexible composite plastic, such as available commercially under the name, Scotch Ply. As used herein, the term "semi-flexible" means that the material is capable of carrying high tension loads, and at least moderate compression loads, without flexure, but is relatively elastic in response to bending loads.

It should be appreciated that, although a tension rod and tension load cell embodiment have been disclosed, the principle of the present invention can also be implemented using a compression rod and compression load cell. In such embodiment, the upper load beam 45 would be below the center of gravity, and the attachment point such as 58 to the hopper would be above the center of gravity 42.

We claim:
1. A weigh hopper installation comprising:
a rigidly supported frame including a load beam extending substantially horizontally at a first elevation;
a hopper having a variable weight and a center of gravity situated laterally adjacent to the frame, said hopper including a substantially planar front wall oriented transversely to the load beam and having a width dimension and a height dimension;
means for supporting substantially all the weight of the hopper through a load cell interposed between the frame and the hopper, said means for supporting the weight of the hopper including a vertically oriented rod having upper and lower portions, one of said rod portions being attached to the support beam and the other of said rod portions being attached to bracket means mounted on the hopper front wall, such that said attached portions of the rod are at elevations above and below the hopper center of gravity, whereby the weight of the hopper and its contents is borne substantially entirely by the rod and said load cell; and
restraint means in the form of semi-flexible strips connected laterally between the frame and the hopper, for preventing horizontal movement of the hopper while permitting vertical movement of the hopper.

2. The weigh hopper of claim 1, wherein the hopper extends vertically from a first elevation higher than the frame to a second elevation lower than the frame.

3. The weigh hopper of claim 1, wherein the load cell is at substantially the same vertical elevation as the hopper center of gravity.

4. The weigh hopper of claim 1, wherein the restraint means includes only two upper restraint members above the means for supporting the hopper and only one lower restraint member below the means for supporting the hopper.

5. The weigh hopper of claim 1 wherein the restraint means are in the form of composite plastic strips.

6. The weigh hopper of claim 1, wherein said rod upper portion is attached to the support beam above the hopper center of gravity, and said rod lower portion is attached to said bracket means below the hopper center of gravity, for rigidly connecting the hopper front wall to said rod lower portion, whereby the weight of the hopper and its contents is borne substantially entirely by the rod in tension; and
the restraint means includes,
first and second, semi-flexible lateral restraint members, each connected between the support frame and the hopper front wall in spaced apart relation along said horizontal dimension above the load cell; and a third semi-flexible lateral restraint member connected between the support frame and the hopper front wall below the load cell.

7. The weigh hopper of claim 6, wherein the restraint means are in the form of flexible composite plastic strips.

8. A weigh hopper installation comprising:
 a rigid girder;
 a support frame rigidly connected to the girder and including a load beam extending substantially horizontally from the girder at a first elevation;
 a hopper situated in spaced relation adjacent the support beam, said hopper having a center of gravity and a front wall oriented transversely to the load beam, the front wall extending horizontally with a width dimension and extending vertically with a height dimension from above said first elevation to a second elevation below said first elevation;
 a vertically oriented tension rod having upper and lower portions, the upper portion being attached to the support beam above the hopper center of gravity, and the lower portion of the rod extending below said center of gravity;
 means for rigidly connecting the hopper front wall to said second portion of the rod, whereby the weight of the hopper and its contents is borne substantially entirely by the rod in tension;
 first and second semi-flexible lateral restraint members, each connected in spaced apart relation between the support frame and the hopper front wall above the hopper center of gravity and substantially in parallel with the load beam and;
 a third semi-flexible lateral restraint member connected between the support frame and the hopper front wall below the hopper center of gravity.

9. The weigh hopper installation of claim 8, wherein the lateral restraint members are in the form of composite plastic strips.

10. The weigh hopper installation of claim 8, wherein the girder extends horizontally, and
 the support frame includes,
  a column rigidly attached to and extending vertically from the girder,
  said load beam, which is rigidly attached to and extends horizontally from the column toward the hopper front wall,
  a brace member rigidly attached to one of the column or load beam and extending horizontally on either side of the load beam in parallel with the front wall, and to which said first and second lateral restraint members are attached, and
  means for attaching the third third lateral restrain member to said column.

* * * * *